(12) United States Patent
Yoeli

(10) Patent No.: US 7,717,368 B2
(45) Date of Patent: May 18, 2010

(54) APPARATUS FOR GENERATING HORIZONTAL FORCES IN AERIAL VEHICLES AND RELATED METHOD

(75) Inventor: Raphael Yoeli, Tel Aviv (IL)

(73) Assignee: Urban Aeronautics Ltd., Ben Gurion Airport (IL)

( * ) Notice: Subject to any disclaimer, the term of this patent is extended or adjusted under 35 U.S.C. 154(b) by 532 days.

(21) Appl. No.: 11/447,311

(22) Filed: Jun. 6, 2006

(65) Prior Publication Data

US 2007/0095971 A1    May 3, 2007

Related U.S. Application Data

(60) Provisional application No. 60/687,857, filed on Jun. 7, 2005.

(51) Int. Cl.
*B64C 29/00* (2006.01)
(52) U.S. Cl. .................. 244/23 D; 244/17.11; 244/12.5
(58) Field of Classification Search .............. 244/53 B, 244/200.1, 204–209, 99.6–8, 23 A, 23 B, 244/23 C, 23 D, 23 R, 7 B, 12.5, 17.19; 239/DIG. 7
See application file for complete search history.

(56) References Cited

U.S. PATENT DOCUMENTS

| | | |
|---|---|---|
| 1,287,076 A | 12/1918 | Moses |
| 2,077,471 A | 4/1937 | Fink |
| 2,138,999 A | 12/1938 | Clark |
| 2,242,201 A | 5/1941 | Woods |
| 2,273,724 A | 2/1942 | Nelson et al. |
| D155,004 S | 8/1949 | Gluhareff |
| 2,709,947 A | 6/1955 | Woods |
| 2,734,705 A | 2/1956 | Robertson |
| 2,777,649 A | 1/1957 | Williams |
| 2,812,636 A * | 11/1957 | Kadosch et al. ........ 239/265.17 |
| 2,899,149 A | 8/1959 | Breguet |
| 2,930,544 A | 3/1960 | Howell |

(Continued)

FOREIGN PATENT DOCUMENTS

EP        0 236583        9/1987

(Continued)

OTHER PUBLICATIONS

Edward D. Flinn, "Revolutionary X-Hawk Hovers Near Success," Aerospace America, Jul. 2003, pp. 26-28.

(Continued)

*Primary Examiner*—Michael R Mansen
*Assistant Examiner*—Michael Kreiner
(74) *Attorney, Agent, or Firm*—Nixon & Vanderhye, P.C.

(57) ABSTRACT

A vehicle, comprising: a vehicle frame; a duct carried by the vehicle frame with the longitudinal axis of the duct perpendicular to the longitudinal axis of the vehicle frame; a propeller rotatably mounted within the duct about the longitudinal axis of the duct to force an ambient fluid through from an inlet at the upper end of the duct through an exit at the lower end of the duct, and thereby produce an upward lift force applied to the vehicle; a first plurality of substantially parallel, spaced vanes non-pivotally mounted across at least the inlet end of the duct; and fluidic means for affecting the ambient fluid flow around the vanes to generate horizontal force components to the lift force applied to the vehicle.

22 Claims, 6 Drawing Sheets

U.S. PATENT DOCUMENTS

| | | | |
|---|---|---|---|
| 2,936,969 A | 5/1960 | Griffith et al. | |
| 2,939,649 A | 6/1960 | Shaw | |
| 2,951,661 A | 9/1960 | Dorman et al. | |
| 2,955,780 A | 10/1960 | Hulbert | |
| 2,968,453 A | 1/1961 | Bright | |
| 2,973,921 A | 3/1961 | Price | |
| 2,975,676 A | 3/1961 | Butler | |
| 2,988,301 A | 6/1961 | Fletcher | |
| 3,033,493 A | 5/1962 | Wilde et al. | |
| 3,039,537 A | 6/1962 | Heidelberg | |
| 3,082,977 A | 3/1963 | Arlin | |
| 3,088,695 A * | 5/1963 | Clark | 244/12.3 |
| 3,090,581 A | 5/1963 | Einarsson | |
| 3,116,898 A | 1/1964 | Clark et al. | |
| 3,136,500 A | 6/1964 | Kerry | |
| 3,161,374 A | 12/1964 | Allred et al. | |
| 3,174,573 A | 3/1965 | Chaplin | |
| 3,179,353 A | 4/1965 | Peterson | |
| 3,181,810 A | 5/1965 | Olson | |
| 3,184,183 A | 5/1965 | Piasecki | |
| 3,187,817 A | 6/1965 | Colley | |
| 3,198,082 A | 8/1965 | Kerris | |
| 3,201,067 A | 8/1965 | Meyerhoff | |
| 3,203,645 A | 8/1965 | Shaw | |
| 3,223,354 A | 12/1965 | Seibold et al. | |
| 3,224,712 A * | 12/1965 | Taylor et al. | 244/53 B |
| 3,231,221 A | 1/1966 | Platt | |
| 3,244,246 A | 4/1966 | Weiland | |
| 3,262,511 A | 7/1966 | Carr | |
| 3,262,657 A | 7/1966 | Anker-Holth | |
| 3,265,329 A | 8/1966 | Postelson-Apostolescu | |
| 3,276,528 A | 10/1966 | Tucknott et al. | |
| 3,289,977 A | 12/1966 | Staats | |
| 3,384,327 A | 5/1968 | Postelson-Apostolesc | |
| 3,397,852 A | 8/1968 | Katzen | |
| 3,397,854 A | 8/1968 | Reyle | |
| 3,454,238 A | 7/1969 | Goodson | |
| 3,463,420 A | 8/1969 | Butler et al. | |
| 3,481,559 A | 12/1969 | Apostolescu | |
| 3,519,224 A | 7/1970 | Boyd et al. | |
| 3,559,921 A | 2/1971 | Timperman | |
| 3,580,530 A | 5/1971 | Wada | |
| 3,606,208 A | 9/1971 | Postelson-Apostolescu | |
| 3,614,030 A | 10/1971 | Moller | |
| 3,627,235 A | 12/1971 | Lippisch | |
| 3,665,809 A | 5/1972 | Darlington et al. | |
| 3,752,417 A | 8/1973 | Lagace | |
| 3,827,527 A | 8/1974 | Bertelsen | |
| 3,873,049 A | 3/1975 | Horsdal | |
| 3,904,155 A | 9/1975 | Chavis | |
| 3,912,201 A | 10/1975 | Bradbury | |
| 3,955,780 A | 5/1976 | Postelson | |
| 3,972,490 A | 8/1976 | Zimmermann et al. | |
| 4,022,405 A | 5/1977 | Peterson | |
| 4,043,421 A | 8/1977 | Smith | |
| 4,149,688 A | 4/1979 | Miller, Jr. | |
| 4,194,707 A | 3/1980 | Sharpe | |
| 4,469,294 A | 9/1984 | Clifton | |
| 4,505,442 A | 3/1985 | Kirsch et al. | |
| 4,505,443 A | 3/1985 | Bradfield et al. | |
| 4,537,372 A | 8/1985 | Forizs | |
| 4,598,890 A | 7/1986 | Herzog et al. | |
| 4,701,602 A | 10/1987 | Schaefer et al. | |
| 4,754,940 A | 7/1988 | Deter | |
| 4,757,962 A | 7/1988 | Grant | |
| 4,765,568 A | 8/1988 | Carl et al. | |
| 4,795,111 A | 1/1989 | Moller | |
| 4,796,836 A | 1/1989 | Buchelt | |
| 4,824,048 A | 4/1989 | Kim | |
| 4,834,319 A | 5/1989 | Ewy et al. | |
| 4,880,071 A | 11/1989 | Tracy | |
| 4,892,274 A | 1/1990 | Pohl et al. | |
| 4,934,629 A | 6/1990 | Brant | |
| 5,064,143 A | 11/1991 | Bucher | |
| 5,101,927 A | 4/1992 | Murtuza | |
| 5,419,514 A | 5/1995 | Ducan | |
| 5,454,531 A | 10/1995 | Melkuti | |
| 5,505,407 A | 4/1996 | Chiappetta | |
| 5,666,483 A | 9/1997 | McClary | |
| 5,738,302 A | 4/1998 | Freeland | |
| 5,746,390 A | 5/1998 | Chiappetta et al. | |
| 5,806,805 A | 9/1998 | Elbert et al. | |
| 5,890,441 A | 4/1999 | Swinson et al. | |
| 6,089,501 A | 7/2000 | Frost | |
| 6,105,901 A | 8/2000 | Ulanoski et al. | |
| 6,119,985 A | 9/2000 | Clapp et al. | |
| 6,170,778 B1 | 1/2001 | Cycon et al. | |
| 6,254,032 B1 | 7/2001 | Bucher | |
| 6,270,038 B1 | 8/2001 | Cycon et al. | |
| 6,318,668 B1 | 11/2001 | Ulanoski et al. | |
| 6,371,406 B1 | 4/2002 | Corcoran | |
| 6,382,559 B1 | 5/2002 | Sutterfield et al. | |
| 6,431,494 B1 | 8/2002 | Kinkead et al. | |
| 6,446,911 B1 | 9/2002 | Yount et al. | |
| 6,457,670 B1 | 10/2002 | Geranio | |
| 6,464,166 B1 * | 10/2002 | Yoeli | 244/12.1 |
| 6,474,598 B2 | 11/2002 | Carter, Jr. | |
| 6,520,449 B2 | 2/2003 | Illingworth | |
| 6,568,630 B2 | 5/2003 | Yoeli | |
| 6,616,094 B2 | 9/2003 | Illingworth | |
| 6,644,598 B2 * | 11/2003 | Glezer et al. | 244/208 |
| 6,704,624 B2 | 3/2004 | Ortega et al. | |
| 6,708,920 B2 | 3/2004 | Fukuyama | |
| 6,745,977 B1 | 6/2004 | Long et al. | |
| 6,751,530 B2 * | 6/2004 | Seifert et al. | 701/4 |
| D496,606 S | 9/2004 | Sanders, Jr. | |
| 6,808,140 B2 | 10/2004 | Moller | |
| 6,817,570 B2 | 11/2004 | Yoeli | |
| 6,824,095 B2 | 11/2004 | Mao | |
| 6,834,832 B2 | 12/2004 | Jamgarov | |
| 6,843,447 B2 | 1/2005 | Morgan | |
| 6,883,748 B2 | 4/2005 | Yoeli | |
| 6,886,776 B2 | 5/2005 | Wagner et al. | |
| 6,892,979 B2 | 5/2005 | Milde | |
| 6,892,980 B2 | 5/2005 | Kawai | |
| 6,913,226 B2 | 7/2005 | Huynh | |
| 6,926,322 B2 | 8/2005 | Browne et al. | |
| 6,974,105 B2 | 12/2005 | Pham | |
| 7,246,769 B2 | 7/2007 | Yoeli | |
| 7,267,300 B2 | 9/2007 | Heath et al. | |
| 7,275,712 B2 | 10/2007 | Yoeli | |
| 2002/0161488 A1 | 10/2002 | Guillemin et al. | |
| 2003/0038213 A1 | 2/2003 | Yoeli | |
| 2003/0062442 A1 | 4/2003 | Milde, Jr. | |
| 2003/0062443 A1 | 4/2003 | Wagner et al. | |
| 2003/0085319 A1 | 5/2003 | Wagner et al. | |
| 2003/0127559 A1 | 7/2003 | Walmsley | |
| 2003/0195673 A1 | 10/2003 | Foch et al. | |
| 2004/0026563 A1 | 2/2004 | Moller | |
| 2004/0104303 A1 | 6/2004 | Mao | |
| 2004/0149857 A1 | 8/2004 | Yoeli | |
| 2004/0155143 A1 | 8/2004 | Yoeli | |
| 2005/0029407 A1 | 2/2005 | Pohl et al. | |
| 2005/0040283 A1 | 2/2005 | Frazer | |
| 2005/0065669 A1 | 3/2005 | Roux et al. | |
| 2005/0178881 A1 | 8/2005 | Yoeli | |
| 2005/0242231 A1 | 11/2005 | Yoeli | |
| 2006/0113426 A1 | 6/2006 | Yoeli | |
| 2006/0231675 A1 | 10/2006 | Bostan | |
| 2007/0034734 A1 | 2/2007 | Yoeli | |
| 2007/0034739 A1 | 2/2007 | Yoeli | |
| 2008/0054121 A1 | 3/2008 | Yoeli | |
| 2008/0142643 A1 | 6/2008 | Yoeli | |
| 2008/0283673 A1 | 11/2008 | Yoeli | |

| | | | |
|---|---|---|---|
| 2009/0084907 | A1 | 4/2009 | Yoeli |
| 2009/0140102 | A1 | 6/2009 | Yoeli |
| 2009/0159757 | A1 | 6/2009 | Yoeli |

FOREIGN PATENT DOCUMENTS

| | | |
|---|---|---|
| EP | 0 922925 | 6/1999 |
| GB | 935884 A | 9/1963 |
| GB | 951186 A | 3/1964 |
| IT | 666076 | 8/1964 |
| IT | 666076 A | 8/1964 |
| SE | 184314 | 6/1963 |
| WO | WO 01/93039 A1 | 12/2001 |
| WO | WO 02/096750 A2 | 12/2002 |
| WO | WO 02/098732 A2 | 12/2002 |
| WO | WO 03/016134 A1 | 2/2003 |
| WO | WO 2004/012993 A1 | 2/2004 |
| WO | WO 2004/031876 A1 | 4/2004 |
| WO | WO 2005/039972 A2 | 5/2005 |
| WO | WO 2006/072960 A2 | 7/2006 |
| WO | WO 2006/131920 | 12/2006 |
| WO | WO 2007/052271 A2 | 5/2007 |
| WO | WO 2007/099543 A2 | 9/2007 |
| WO | WO 2007/129313 A2 | 11/2007 |
| WO | WO 2008/065654 A2 | 6/2008 |
| WO | WO 2008/065664 A2 | 6/2008 |
| WO | 2008/135973 A2 | 11/2008 |
| WO | WO 2009/077968 A2 | 6/2009 |

OTHER PUBLICATIONS

Raymond L. Robb, "Driving on Air: 20$^{th}$ Century Flying Carpets," Vertiflite, vol. 51, No. 1, Spring 2005, pp. 2-11.
Urban Aeronautics Ltd., "The X-Hawk VTOL Utility Vehicle"—product description and specifications; 2004.
Piasecki Aircraft Corporation Product Description and History for Piasecki VZ-8 VTOL research vehicle (undated).
International Search Report for International Application No. PCT/IL02/00417 (now WO 02/096750 (Yoeli)), dated May 23, 2003, published Oct. 2, 2003.
Written Opinion in International Application No. PCT/IL02/00417 (now WO 02/096750 (Yoeli)), Aug. 19, 2003.
International Preliminary Examination Report for International Application No. PCT/IL02/00417 (now WO 02/096750 (Yoeli)), Oct. 20, 2003.
Corrected International Preliminary Examination Report for International Application No. PCT/IL02/00417 (now WO 02/096750 (Yoeli)), Jul. 25, 2004.
International Search Report for International Application No. PCT/IL02/000439 (now WO 2002/098732 (Yoeli)), dated Apr. 28, 2003, published Mar. 18, 2004.
International Preliminary Examination Report in International Application No. PCT/IL02/000439 (now WO 2002/098732 (Yoeli)), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876 (Yoeli)), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Copending U.S. Appl. No. 10/987,321 (Yoeli) filed at the U.S. Patent Office Nov. 15, 2004.
Copending U.S. Appl. No. 10/523,609 (Yoeli) filed at the U.S. Patent Office Feb. 7, 2005 (International Application date Aug. 5, 2003).
Copending U.S. Appl. No. 11/061,652 (Yoeli) filed at the U.S. Patent Office Feb. 22, 2005.
Copending U.S. Appl. No. 11/411,243 (Yoeli) filed at the U.S. Patent Office Apr. 26, 2006 (International Application date Oct. 27, 2004).
Copending U.S. Appl. No. 11/405,003 (Yoeli) filed at the U.S. Patent Office Apr. 17, 2006.
De Lorean DMC-12, alleged to have first been produced in 1981 (images available from Wikipedia, the free encyclopedia, at http://en.wikipedia.org/wiki/De_Lorean_DMC-12).
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
Written Opinion of the International Searching Authority in International Application No. PCT/IL006/00032 (Yoeli), dated Sep. 11, 2006.
International Preliminary Report on Patentability in International Application No. PCT/IL06/00032 (Yoeli), dated Sep. 11, 2006.
U.S. Appl. No. 11/826,202, filed Jul. 12, 2007.
U.S. Appl. No. 11/798,187, filed May 10, 2007.
U.S. Appl. No. 11/794,906, filed Jul. 9, 2007.
U.S. Appl. No. 11/892,414, filed Aug. 22, 2007.
International Search Report for International Application No. PCT/IL06/00663 (Yoeli) dated Dec. 19, 2006.
Written Opinion of the International Searching Authority in International Application No. PCT/IL06/00663 (Yoeli) dated Dec. 19, 2006.
English Abstract of Italian Patent No. 666076, dated Aug. 1964.
International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
U.S. Appl. No. 12/224,549 (Yoeli) filed Nov. 4, 2008.
U.S. Appl. No. 12/226,952 (Yoeli) filed Feb. 27, 2009.
Written Opinion and Search Report of the International Searching Authority in International Application No. PCT/IL07/00271 (now WO 2007/099543 A2) (Yoeli) dated Oct. 28, 2008.
Written Opinion and Search Report of the International Searching Authority in International Application No. PCT/IL07/01475 (now WO 2008/065664 A2) (Yoeli) dated Sep. 2, 2008.
Corrected Written Opinion and Search Report of the International Searching Authority in International Application No. PCT/IL07/01475 (now WO 2008/065664 A2) (Yoeli) dated Jul. 27, 2009.
Written Opinion and International Search Report of the International Searching Authority in International Application No. PCT/IB08/055301 (now WO 2009/077968) (Yoeli) dated Aug. 14, 2009.
U.S. Appl. No. 12/516,257 (Yoeli) filed May 26, 2009.
U.S. Appl. No. 12/516,743 (Yoeli) filed May 28, 2009.
Written Opinion and International Search Report of the International Searching Authority in International Application No. PCT/IB09/052346 (Yoeli) dated Oct. 20, 2009.

* cited by examiner

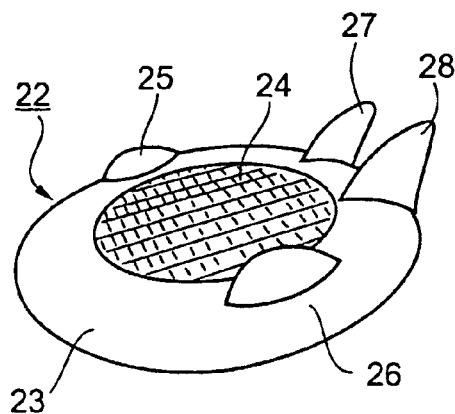
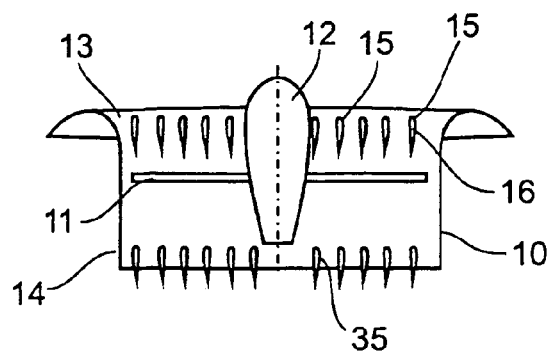
Fig. 11                      Fig. 12
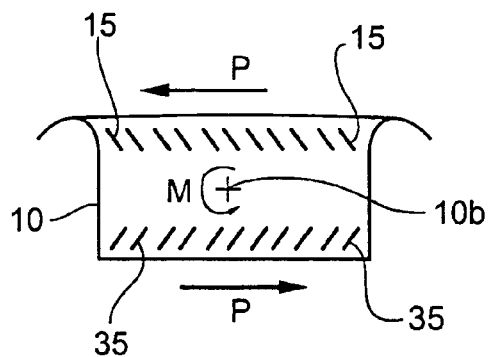
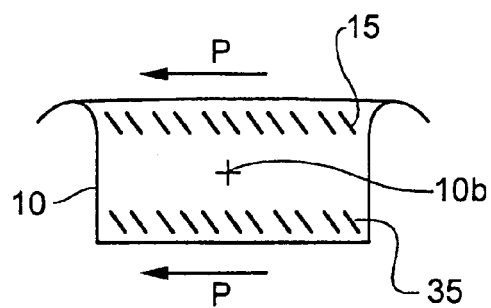
Fig. 13a                     Fig. 13b
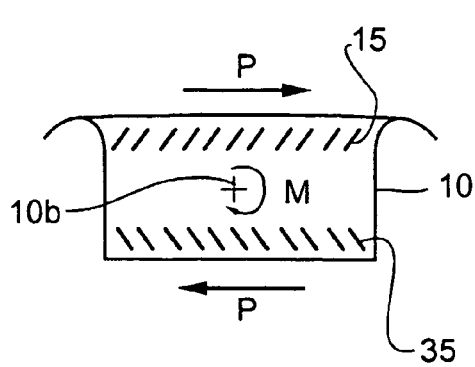
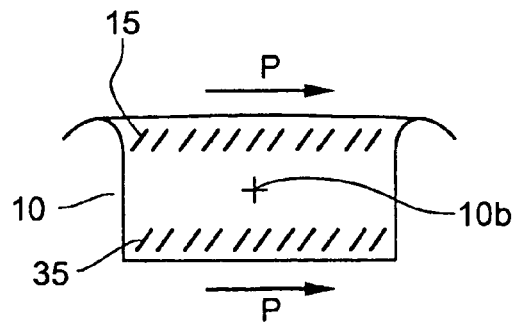
Fig. 13c                     Fig. 13d

APPARATUS FOR GENERATING HORIZONTAL FORCES IN AERIAL VEHICLES AND RELATED METHOD

RELATED APPLICATION

This application claims priority from Provisional Application No. 60/687,857, filed Jun. 7, 2005, the entirety of which is incorporated herein by reference.

BACKGROUND OF THE INVENTION

The present invention relates to ducted fan vehicles, and particularly to such vehicles useful as VTOL (Vertical Take-Off and Landing) aircraft.

Many different types of VTOL aircraft have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on propellers that are installed inside circular cavities, shrouds, ducts or other types of nacelles, where the propeller or rotor is not exposed, and where the flow of air takes place inside a circular duct. Most ducts have uniform cross-sections with the exit area (usually at the bottom of the duct when the vehicle is hovering) being similar to that of the inlet area (at the top of the duct). Some ducts, however, are slightly divergent, having an exit area that is larger than the inlet area, as this was found to increase efficiency and reduce the power required per unit of lift for a given inlet diameter. Some ducts have a wide inlet lip in order to augment the thrust obtained, especially in hover.

VTOL vehicles are usually more challenging than fixed wing aircraft in terms of stability and control. The main difficulty arises from the fact that, contrary to fixed wing aircraft which accelerate on the ground until enough airspeed is achieved on their flight surfaces, VTOL vehicles hover with sometimes zero forward airspeed. For these vehicles, the control relies on utilizing the rotors or propellers themselves, or the flow of air that they produce to create control forces and moments and forces around the vehicle's center of gravity (CG).

One method, which is very common in helicopters, is to mechanically change, by command from the pilot, the pitch of the rotating rotor blades both collectively and cyclically, and to modify the main thrust as well as moments and/or inclination of the propeller's thrust line that the propeller or rotor exerts on the vehicle. Some VTOL vehicles using ducted or other propellers that are mounted inside the vehicle also employ this method of control. Some designers choose to change only the angle of all the blades using ducted or other propellers that are mounted inside the vehicle for this method of control. The angle of all the blades may be changed simultaneously (termed collective control) to avoid the added complexity of changing the angle of each blade individually (termed cyclic control). On vehicles using multiple fans which are relatively far from the CG, different collective control settings can be used on each fan to produce the desired control moments.

The disadvantage of using collective controls, and especially cyclic controls, lies in their added complexity, weight and cost. Therefore, a simple thrust unit that is also able to generate moments and side forces, while still retaining a simple rotor not needing cyclic blade pitch angle changes, has an advantage over the more complex solution. The main problem is usually the creation of rotational moments of sufficient magnitude required for control.

One traditional way of creating moments on ducted fans is to mount a discrete number of vanes at or slightly below the exit section of the duct. These vanes, which are immersed in the flow exiting the duct, can be deflected to create a side force. Since the vehicle's center of gravity is in most cases at a distance above these vanes, the side force on the vanes also creates a moment around the vehicle's CG.

However, one problem associated with vanes mounted at the exit of the duct in the usual arrangement as described above, is that even if these are able to create some moment in the desired direction, they cannot do so without creating at the same time a significant side force that has an unwanted secondary effect on the vehicle. For such vanes mounted below the vehicle's CG (which is the predominant case in practical VTOL vehicles), these side forces cause the vehicle to accelerate in directions which are usually counter-productive to the result desired through the generation of the moments by the same vanes, thereby limiting their usefulness on such vehicles.

The Chrysler VZ-6 VTOL flying car uses vanes on the exit side of the duct, together with a small number of very large wings mounted outside and above the duct inlet area.

However, in the VZ-6, the single wing and the discrete vanes were used solely for the purpose of creating a steady, constant forward propulsive force, and not for creating varying control moments as part of the stability and control system of the vehicle.

The Hornet unmanned vehicle developed by AD&D, also experimented with using either a single, movable large wing mounted outside and above the inlet, or, alternatively using a small number of vanes close to the inlet side. However these were fixed in angle and could not be moved in flight.

Another case that is sometimes seen is that of vanes installed radially from the center of the duct outwards, for the purpose of creating yawing moments (around the propeller's axis).

BRIEF SUMMARY OF THE INVENTION

The present invention provides a vehicle with a ducted fan propulsion system which also produces rotary moments and side forces for control purposes. A vehicle of the foregoing type is particularly useful as a VTOL aircraft.

According to a broad aspect of the present invention, there is provided a vehicle, comprising: a vehicle frame; a duct carried by the vehicle frame with the longitudinal axis of the duct perpendicular to the longitudinal axis of the vehicle frame; a propeller rotatably mounted within the duct about the longitudinal axis of the duct to force an ambient fluid therethrough from its inlet at the upper end of the duct through its exit at the lower end of the duct, and thereby to produce an upward lift force applied to the vehicle; and a plurality of spaced vanes mounted to and across the inlet end of the duct about pivotal axes perpendicular to the longitudinal axis of the duct and selectively operational to produce a desired horizontal control force in addition to the lift force applied to the vehicle.

It has been found that such a vehicle equipped with a plurality of such vanes mounted across the inlet of the duct (as distinguished from the exit end of the duct) can indeed produce a combination of side forces with rotational moment that is favorable to the normal control of the vehicle. It has also been found that such vanes across the inlet end of the duct, particularly when combined with a second plurality of vanes across the outlet end of the duct, can produce desired forward, aft, left and right translation movements, as well as yaw, pitch and roll rotary movement of the vehicle.

In some described preferred embodiments, the vanes are substantially parallel to the longitudinal axis of the vehicle frame.

Another embodiment is described wherein the vanes include a first group of parallel vanes extending across one half of the inlet of the duct and pivotal about axes at a predetermined acute angle with respect to the longitudinal axis of the vehicle frame; and a second group of parallel vanes extending across the remaining half of the inlet end of the duct and pivotal about axes at the predetermined angle, but in the opposite direction, with respect to the longitudinal axis of the vehicle frame; the first and second groups of vanes being selectively operational to produce a desired net control force in addition to the lift force applied to the vehicle.

According to further features in the described preferred embodiments, the vanes have a symmetrical airfoil shape, or alternatively a slightly non-symmetrical airfoil shape, and are spaced from each other a distance substantially in the range of between 50% and 100% of the chord length of the vanes.

In one described preferred embodiment, each of the vanes is pivotally mounted as a unit for its complete length to produce a desired side force component. In a second described embodiment, each of the vanes is split into two halves, each half of all the vanes being separately pivotal from the other half of all the vanes, whereby the component force to the lift force applied to the vehicle is a rotary moment force about the duct longitudinal axis.

Other embodiments are described wherein, in one case, each of the vanes is pivotally mounted about an axis passing through the vane, and in another case, each of the vanes includes a fixed section and a pivotal section pivotally mounted at the trailing side of the fixed section.

According to further features in some described preferred embodiments, the duct includes a second plurality of parallel, spaced vanes pivotally mounted to and across the inlet end of the duct about pivotal axes perpendicular to the pivotal axes of the first mentioned plurality of vanes and perpendicular to the longitudinal axis of the duct.

In one described preferred embodiment, the pivotal axes of the second plurality of vanes are in a plane vertically spaced from the pivotal axes of the first-mentioned plurality of vanes; whereas in a second described embodiment, the pivotal axes of the second plurality of vanes are in a common plane with that of the pivotal axes of the first-mentioned plurality of vanes. With respect to the latter embodiment, it may be desirable to have a slight shift in the two planes in order to offset the pivotal mounting of the vanes, but in such case, the shift would be relatively small, e.g., less than one chord length.

Another embodiment is described wherein the duct includes a second plurality of spaced vanes pivotally mounted to and across the exit end of the duct about pivotal axes perpendicular to the longitudinal axis of the duct and selectively pivotal about their axes to produce another desired side control force or rotary moment control force, in addition to the lift force applied to the vehicle.

While the invention has been described above particularly with respect to pivotally mounted vanes it will be appreciated that the invention or various aspects of the invention as described can also be advantageously used when described with non pivotal vanes.

Such non pivotal vanes may employ aerodynamic means other than rotation to modify the pressure field around the vanes for creating a side force, such as air suction or blowing through orifices on the surface of the vanes or piezoelectric actuators or other fluidic control means to induce steady or periodic pressure field changes to the flow around the vanes, all with the purpose of producing desired side control force or rotary moment control force, in addition to the lift force applied to the vehicle Therefore, according to a broad aspect of the present invention, there is provided a vehicle, comprising: a vehicle frame; a duct carried by the vehicle frame with the longitudinal axis of the duct perpendicular to the longitudinal axis of the vehicle frame; a propeller rotatably mounted within the duct about the longitudinal axis of the duct to force an ambient fluid through from its inlet at the upper end of the duct through its exit at the lower end of the duct, and thereby to produce an upward lift force applied to the vehicle; and a plurality of parallel spaced vanes of either airfoil cross section or elliptical cross section, or any other shape as required to facilitate vane operation, that are non-pivotally mounted to and across the inlet end of the duct about and substantially parallel to said longitudinal axis of the vehicle frame, said vanes being operative to have means of affecting said ambient fluid through either air suction or blowing through orifices on the surface of the vanes or piezoelectric actuators or other fluidic control means to induce steady or periodic pressure field changes to the flow around the vanes, all with the purpose of producing desired side control force or rotary moment control force, in addition to the lift force applied to the vehicle Such a vehicle equipped with a plurality of such non-pivotal vanes mounted across the inlet of the duct (as distinguished from the exit end of the duct) can indeed produce a combination of side forces with rotational moment that is favorable to the normal control of the vehicle. It has also been found that side-force producing vanes across the inlet end of the duct, particularly when combined with a second plurality of vanes across the outlet end of the duct, can produce desired forward, aft, left and right translation movements, as well as yaw, pitch and roll rotary movement of the vehicle.

All the various different embodiments of the invention described herein with pivotal or partially pivotal vanes can be advantageously used when the pivotal vanes are replaced by non-pivotal ones with operation as described above.

While the invention has been described above particularly with respect to either pivotally or non-pivotally mounted vanes it will be appreciated that the invention or various aspects of the invention as described can also be advantageously used with a combination of such pivotal and non pivotal vanes such that each type of vanes is used according to its advantage such as control power output endurance or contingency in case of failure.

According to further features in some described preferred embodiments the vanes are twisted along their longitudinal axis to better adjust their plane of symmetry to the local variations in the incoming flow into the duct.

According to further features in some described preferred embodiments, fluidic control means such as air suction or blowing through orifices or piezoelectric actuators or other fluidic control means to induce steady or periodic pressure field changes to the flow around the vanes, are added to or incorporated into the inner surface of the duct, in the vicinity of the vanes all with the purpose of affecting the flow field in the vicinity of the duct wall and adjacent vanes, to straighten or improve the flow around the vanes, or for avoiding separation of the flow from the duct wall and between the vanes and said duct wall.

The invention will now be described in detail in connection with the drawings identified below.

BRIEF DESCRIPTION OF THE DRAWINGS

The invention is herein described, by way of example only, with reference to the accompanying drawings, wherein:

FIG. 11 illustrates a VTOL aircraft vehicle including a single ducted fan for propulsion and control purposes;

FIG. 12 is a view similar to that of FIG. 3 but illustrating the provision of a cascade or plurality of vanes also at the exit end of the duct;

FIGS. 13a-13d illustrate various pivotal positions of the two cascades of vanes in the ducted fan of FIG. 12, and the forces produced by each such positioning of the vanes;

DESCRIPTION OF PREFERRED EMBODIMENTS

Figure 1:
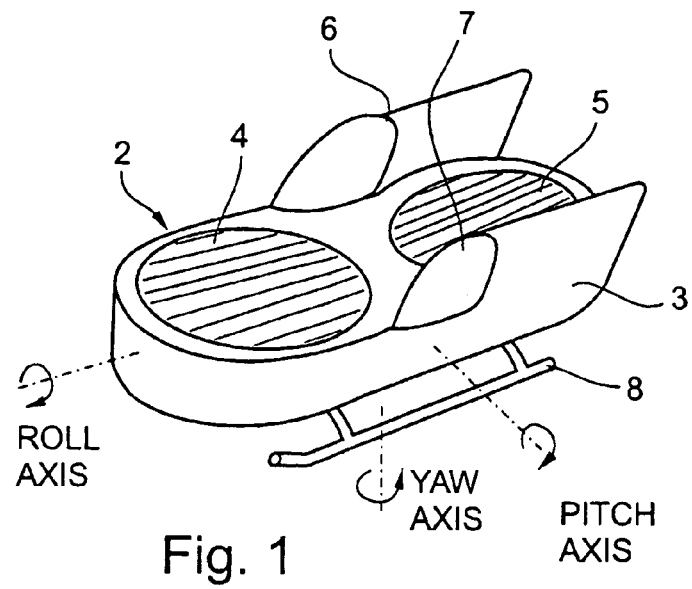
FIG. 1 illustrates one form of VTOL aircraft vehicle constructed in accordance with the present invention.

The vehicle illustrated in FIG. 1, and therein generally designated 2, is a VTOL aircraft including a frame or fuselage 3 carrying a ducted fan propulsion unit 4 at the front, and another similar propulsion unit 5 at the rear. The vehicle payload is shown at 6 and 7, respectively, on opposite sides of the fuselage, and the landing gear as shown at 8.

Figure 2:
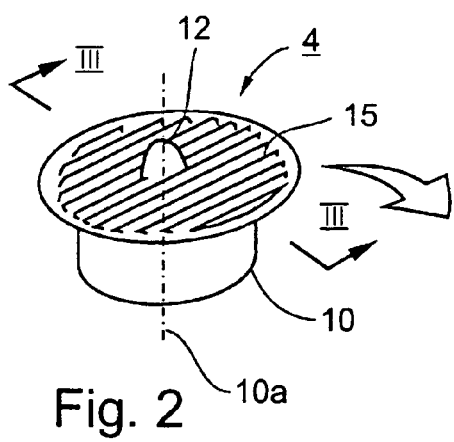
FIG. 2 illustrates only one of the ducted fans in the aircraft of FIG. 1.
Figure 3:
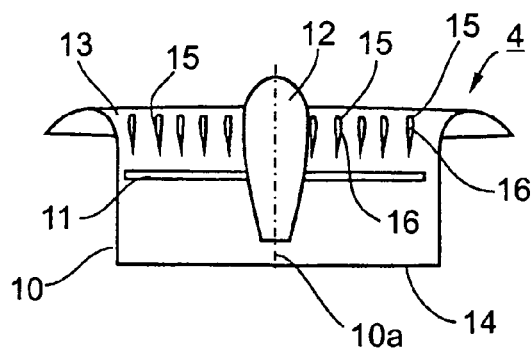
FIG. 3 is a sectional view along line III-III of FIG. 2.

FIGS. 2 and 3 more particularly illustrate the structure of propulsion unit 4, which is the same as propulsion unit 5. Such a propulsion unit includes a duct 10 carried by the fuselage 3 with the vertical axis 10a of the duct parallel to the vertical axis of the vehicle. Propeller 11 is rotatably mounted within the duct 10 about the longitudinal axis 10a of the duct. Nose 12 of the propeller faces upwardly, so that the upper end 13 of the duct constitutes the air inlet end, and the lower end 14 of the duct constitutes the exit end. As shown particularly in FIG. 3, the upper air inlet end 13 is formed with a funnel-shaped mouth to produce a smooth inflow of air into the duct 10, which air is discharged at high velocity through the exit end 14 of the duct for creating an upward lift force.

Figure 4:
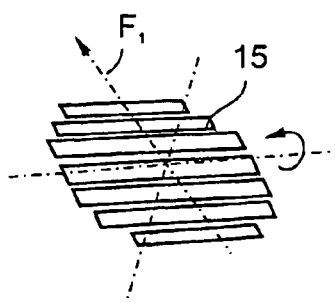
FIG. 4 is a diagram illustrating the positioning of the vanes of FIG. 3 in one direction to produce a lateral force in one direction.
Figure 5:
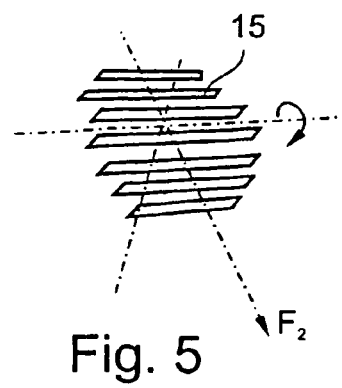
FIG. 5 is a diagram illustrating the positioning of the vanes of FIG. 3 to produce a lateral force in the opposite direction.

To provide directional control, the duct 10 is provided with a plurality of parallel, spaced vanes 15 pivotally mounted to, and across, the inlet end 13 of the duct. Each of the vanes 15 is pivotal about an axis 16 perpendicular to the longitudinal axis 10a of the duct 10 and substantially parallel to the longitudinal axis of the vehicle frame 2, to produce a desired horizontal control force in addition to the lift force applied to the vehicle by the movement of air produced by the propeller 11. Thus, as shown in FIG. 4, if the vanes 15 are pivoted in one direction about their respective axes, they produce a desired control force in the direction of the arrow F1 in FIG. 4; and if they are pivoted in the opposite direction, they produce a desired control force in the direction of the arrow F2 in FIG. 5. As shown in FIG. 3 (also FIGS. 7, 8, 12), the vanes 15 are of a symmetric airfoil shape and are spaced from each other a distance approximately equal to the chord length of the vanes.

Figure 6:
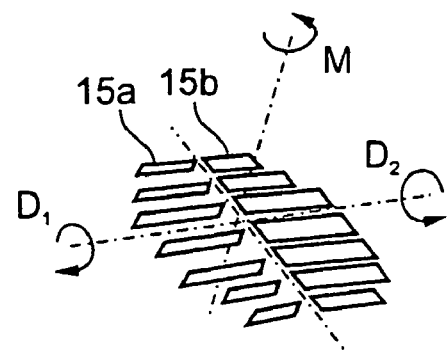
FIG. 6 illustrates a modification in the construction of the vanes wherein each of the vanes is split into two halves, each half of all the vanes being separately pivotal from the other half of all the vanes to produce a rotary moment force about the duct longitudinal axis.

FIG. 6 illustrates a variation wherein each of the vanes 15, instead of being pivotally mounted as a unit for its complete length to produce the desired side control force is split into two half-sections, as shown at 15a and 15b in FIG. 6, with each half-section separately pivotal from the other half-section. Thus, all the half-sections 15a may be pivoted as a unit in one direction as shown by arrow D1, and all the half-sections 15b may be pivoted in the opposite direction as shown by arrow D2, to thereby produce any desired side force or rotary moment in addition to the lift force applied to the vehicle by the propeller.

Figure 7:
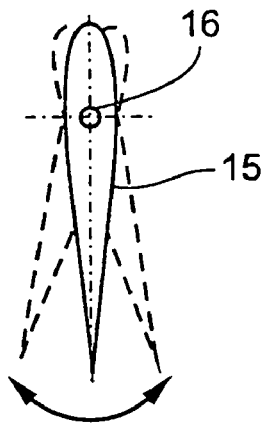
FIG. 7 is a diagram illustrating the construction of one of the vanes and the manner for pivoting it.
Figure 8:
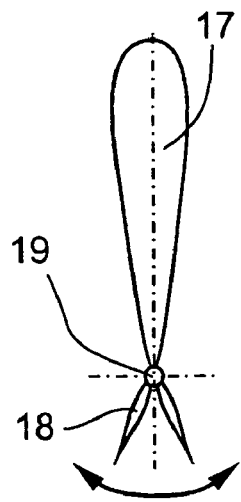
FIG. 8 illustrates an alternative construction of one of the vanes and the manner for pivoting it.

As shown in FIG. 7, each of the vanes 15 is pivotally mounted about axis 16 passing through a mid portion of the vane. FIG. 8 illustrates a modification wherein each vane includes a fixed section 17, which constitutes the main part of the vane, and a pivotal section or flap 18 pivotally mounted at 19 to the trailing side of the fixed section. It will thus be seen that the pivotal section or flap 18 may be pivoted to any desired position in order to produce the desired control force in addition to the lift.

Figure 9:
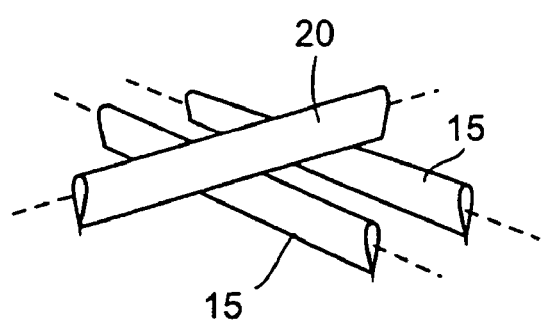
FIG. 9 illustrates one arrangement that may be used for providing two cascades or assemblies of vanes at the inlet end of the duct of FIG. 9.

FIG. 9 illustrates a variation wherein the ducted fan (4 and/or 5 FIG. 1) includes a second plurality or cascade of parallel, spaced vanes, one of which is shown at 20, pivotally mounted to and across the inlet end 13 of the duct 10. Thus, each of the vanes 20 of the second plurality is closely spaced to the vanes 15 and is pivotal about an axis perpendicular to the pivotal axis of the vanes 15, as well as to the longitudinal axis 10a of the duct.

Figure 10:
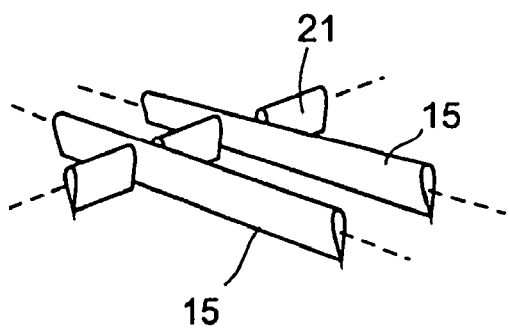
FIG. 10 illustrates another arrangement that may be used for providing two cascades or assemblies of vanes at the inlet end of the duct.

In the variation illustrated in FIG. 9, the two cascades of vanes 15, 20, are arranged in parallel, spaced planes. FIG. 10 illustrates a variation wherein the two cascades of vanes at the inlet end of the duct are intermeshed. For this purpose, each of the vanes 21 of the second plurality would be interrupted so as to accommodate the crossing vanes 15 of the first plurality, as shown in FIG. 10. Another possible arrangement would be to have the vanes of both cascades interrupted for purposes of intermeshing.

FIG. 11 illustrates a VTOL aircraft vehicle, therein generally designated 22, including a single ducted fan 24 carried centrally of its fuselage 23. Such a vehicle could include the arrangement of vanes illustrated in either FIG. 9 or in FIG. 10 to provide the desired control forces and moments in addition to the lift forces. In such a vehicle, the payload may be on opposite sides of the central ducted fan 24, as shown at 25 and 26 in FIG. 11. The vehicle may also include other aerodynamic surfaces, such as rudders 27, 28 to provide steering and other controls.

FIG. 12 illustrates a further embodiment that may be included in either of the vehicles of FIGS. 1 and 11 wherein the duct 10 also has a second plurality or cascade of parallel, spaced vanes, but in this case, the second plurality are pivotally mounted to and across the exit end 14 of the duct 10. Thus, as shown in FIG. 12, the duct 10 includes the first plurality or cascade of blades 15 mounted to and across the inlet end 13 of the duct, and a second plurality or cascade of blades 35 mounted to and across the exit end 14 of the duct 10, also perpendicular to the longitudinal axis of the duct and substantially parallel to the longitudinal axis of the vehicle frame. Each assembly or cascade 15, 35 of the vanes may be pivoted independently of the other to produce selected side forces or rotary moments about the duct's transverse axis for pitch or roll control of the vehicle.

This is more clearly shown in the diagrams of FIGS. 13a-13d. Thus, when the two cascades of vanes 15, 35, are pivoted in opposite directions, they produce a rotary moment about the transverse axis 10b of the duct 10 in one direction (e.g., counter-clockwise as shown in FIG. 13a); when they are pivoted in the same direction, they produce a side force in one direction (e.g. left) as shown in FIG. 13b when pivoted in opposite directions but opposite to the arrangement shown in FIG. 13a, they produce a rotary moment in the opposite clockwise direction as shown in FIG. 13c; and when they are pivoted in the same direction but opposite to that shown in FIG. 13b, they produce a side force in the opposite (e.g. right) direction, as shown in FIG. 13d.

Figure 14:
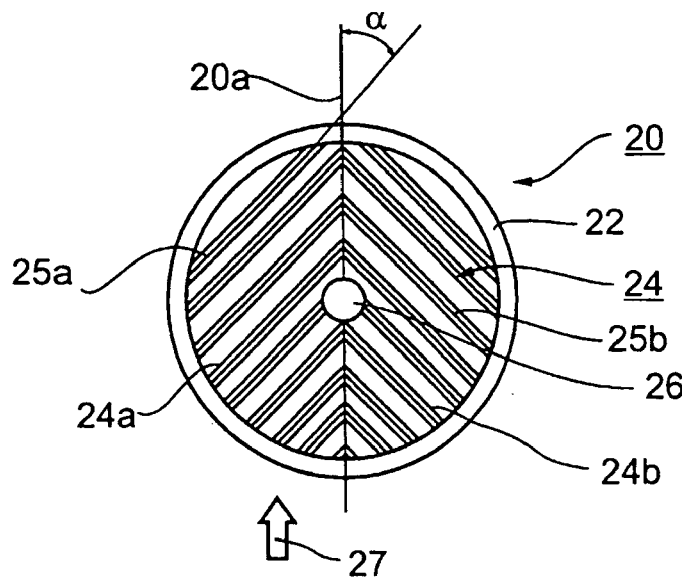
FIG. 14 is a top view diagrammatically illustrating another construction wherein the vanes extending across the inlet of the duct are divided into two groups together producing the desired net horizontal control force.

FIG. 14 is a top view illustrating another construction of ducted fan propulsion unit, generally designated 20, including a duct 22 having a plurality of vanes 24 extending across the inlet end of the duct. In this case, the vanes 24 are divided into a first group of parallel vanes 24a extending across one-half the inlet end of the duct 22, and a second group of parallel vanes 24b extending across the remaining half of the inlet end of the duct.

FIG. 14 also illustrates the nose 26 of the propeller within the duct 22. The propeller is rotatably mounted within the duct 22 about the longitudinal axis of the duct, with the nose 26 of the propeller centrally located at the air inlet end of the duct such that the air discharged at a high velocity through the opposite end of the duct creates an upward lift force.

As shown in FIG. 14, the first group of parallel vanes 24a extending across one half of the inlet end of the duct 22 are pivotal about axes 25a at a predetermined acute angle α with respect to the longitudinal axis 20a of the vehicle frame and thereby of the direction of movement of the vehicle as shown by arrow 27; and that the second group of parallel vanes extending across the remaining half of the inlet end of the duct are pivotal about axes 25b at the same predetermined angle α, but in the opposite direction, with respect to the longitudinal axis 20a of the vehicle frame. The two groups of vanes 24a, 24b are selectively pivotal to produce a desired net horizontal control force in addition to the lift force applied to the vehicle.

Figures 15A, 15B:
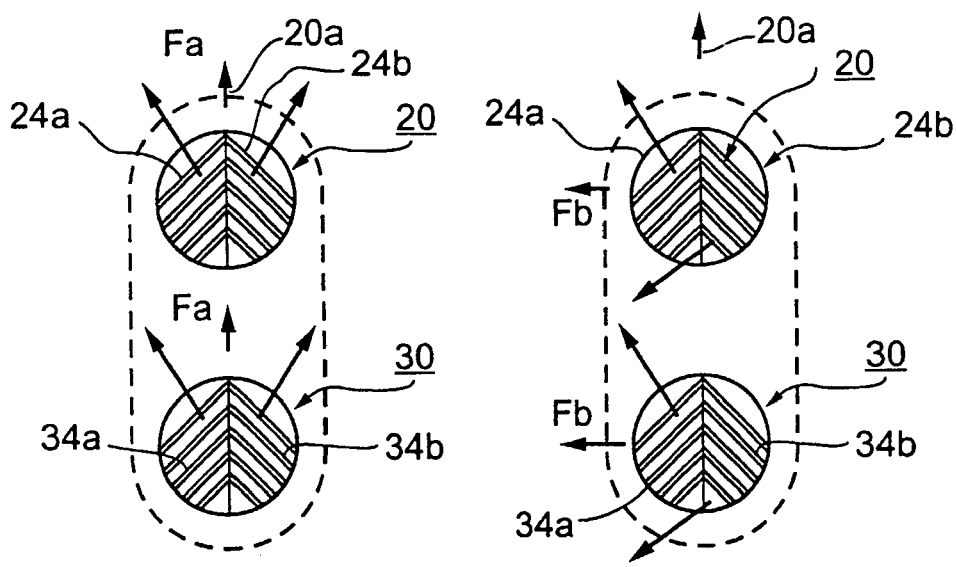
FIGS. 15a and 15b diagrammatically illustrate the manner in which the desired net horizontal control force is produced by the vanes of FIG. 14.

The foregoing operations are illustrated in the diagrams of FIGS. 15a and 15b. Both FIGS. 15a and 15b illustrate the control forces generated when the vehicle includes two ducted fan propulsion units 20, 30, at the opposite ends of the vehicle and coaxial with the vehicle longitudinal axis 20a. It will be appreciated that comparable forces are produced when the vehicle is equipped with only one ducted fan propulsion unit shown in FIG. 14.

FIG. 15a illustrates the condition wherein the two groups of vanes 24a, 24b are pivoted to equal angles about their respective axes 25a, 25b. The vanes thus produce, in addition to the lift force, control forces of equal magnitude and angles on opposite sides of the vehicle longitudinal axis 20a, so as to produce a net force, shown at Fa, coaxial with the vehicle longitudinal axis 20a.

The two groups of vanes 34a, 34b of the rear propulsion unit 30 are pivotal in the same manner about their respective pivotal axes 35a, 35b, and thereby produce a net force Fa also coaxial with the vehicle longitudinal axis 20a.

FIG. 15b illustrates a condition wherein the two groups of vanes 24a, 24b in the fore propulsion unit 20, and the two groups of vanes 34a, 34b in the aft propulsion unit 30, are pivoted about their respective axes to unequal angles, thereby producing net side forces Fb at an angle to the vehicle longitudinal axis 20a. Thus, by controlling the pivot angles of the vanes 24a, 24b and 34a, 34b about their respective pivotal axes, a net control force may be generated as desired in the plane of the vanes.

Figure 16:
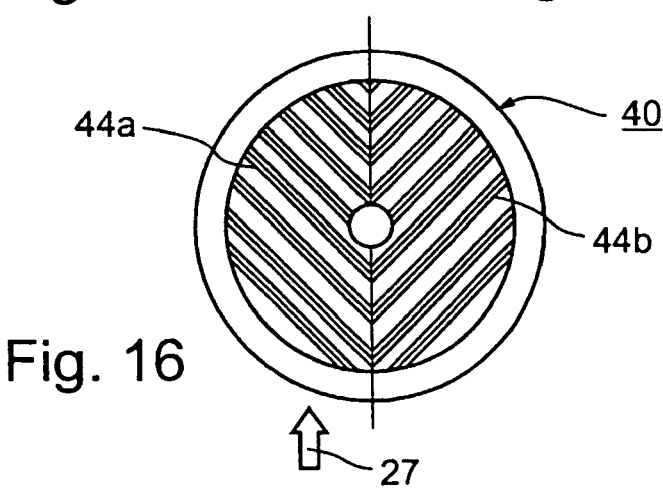
FIG. 16 is a view corresponding to that of FIG. 14 but illustrating a variation in the vane arrangement for producing the desired net horizontal control force.

FIG. 16 illustrates a ducted fan propulsion unit, generally designated 40, also including two groups of vanes 44a, 44b, extending across one-half of the inlet of the duct 42 and pivotally mounted about axes 45a, 45b at a predetermined angle (e.g., 45°) to the longitudinal axis 40a of the vehicle. In this case, however, the vanes 44a, 44b are oriented in the forward direction, rather than in the aft direction as in FIG. 14, but the operation, and the forces generated by the vanes, are basically the same as described above with respect to FIGS. 14, 15a, 15b.

Figure 17:
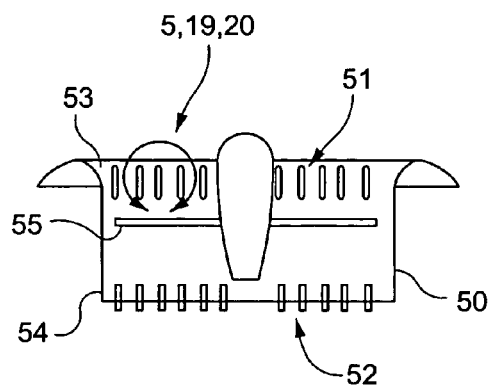
FIG. 17 is a view similar to that of FIG. 12 but illustrating the provision of a cascade or plurality of non-pivotal vanes at the inlet and exit of the duct.

As mentioned above, non-pivotal vanes may be employed to create side forces when used in combination with other aerodynamic means that generate those forces. In this regard, FIG. 17 illustrates a duct 50 having first and second pluralities of non-pivotal vanes 51, 52 at respective inlet and exit ends 53, 54 of the duct, on either side of the propeller 55. The aerodynamic means may include fluidic control means including piezoelectric actuators or other fluidic control devices to induce steady or periodic pressure field changes to the flow around the vanes. Other suitable means may include air suction or blowing pressurized air through suitably located apertures in the duct wall or in the vanes themselves at either or both of the inlet and exit ends of the duct.

FIGS. 18a-18d illustrate that forces produced by other aerodynamic means on non-pivotal vanes may be basically the same as those produced by pivotally mounted vanes as shown in FIGS. 12 and 13.

Figure 19:
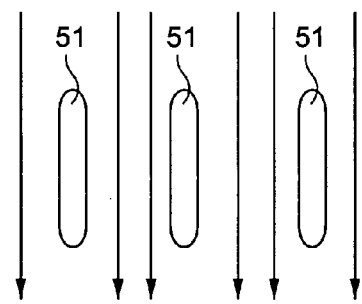
FIG. 19 is an enlarged detail A of FIG. 17 which illustrates a schematic uninterrupted fluid flow when vanes are non operative.
Figure 18A:
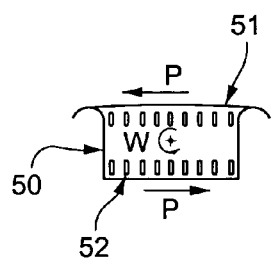
FIG. 18a-d illustrate forces produced by various operation of the two cascades of non-pivotal vanes in the ducted fan of FIG. 17 which are similar to the forces produced by the pivotally mounted vanes as shown in FIG. 13a-13d.
Figure 18B:
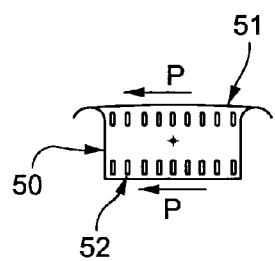
Figure 18C:
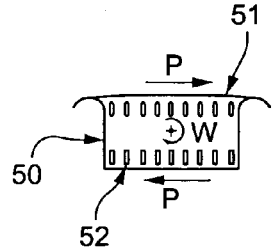
Figure 18D:
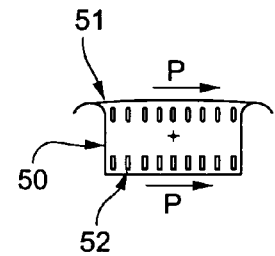

FIG. 19 illustrates a schematic flow profile through the vanes 51 of duct 50 when the vanes are non-operational, i.e., when no means are employed to alter the flow.

Figure 20:
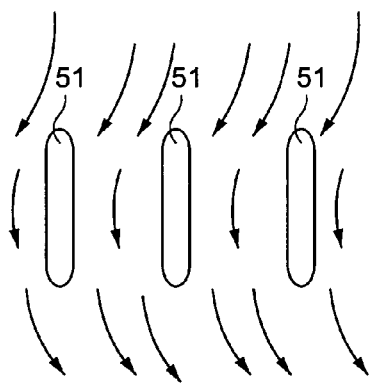
FIG. 20 is an enlarged detail A of FIG. 17 which illustrates a schematic fluid flow when vanes are operative to produce forces as shown in the upper vanes of FIG. 18 *a* and *b*.

FIG. 20 illustrates the same duct/vane arrangement but where the fluidic control means are made operational to alter the flow of air so as to alter the pressure distribution in the flow in the vicinity and on the surface of the vanes, thereby inducing the desired side forces.

Figure 21:
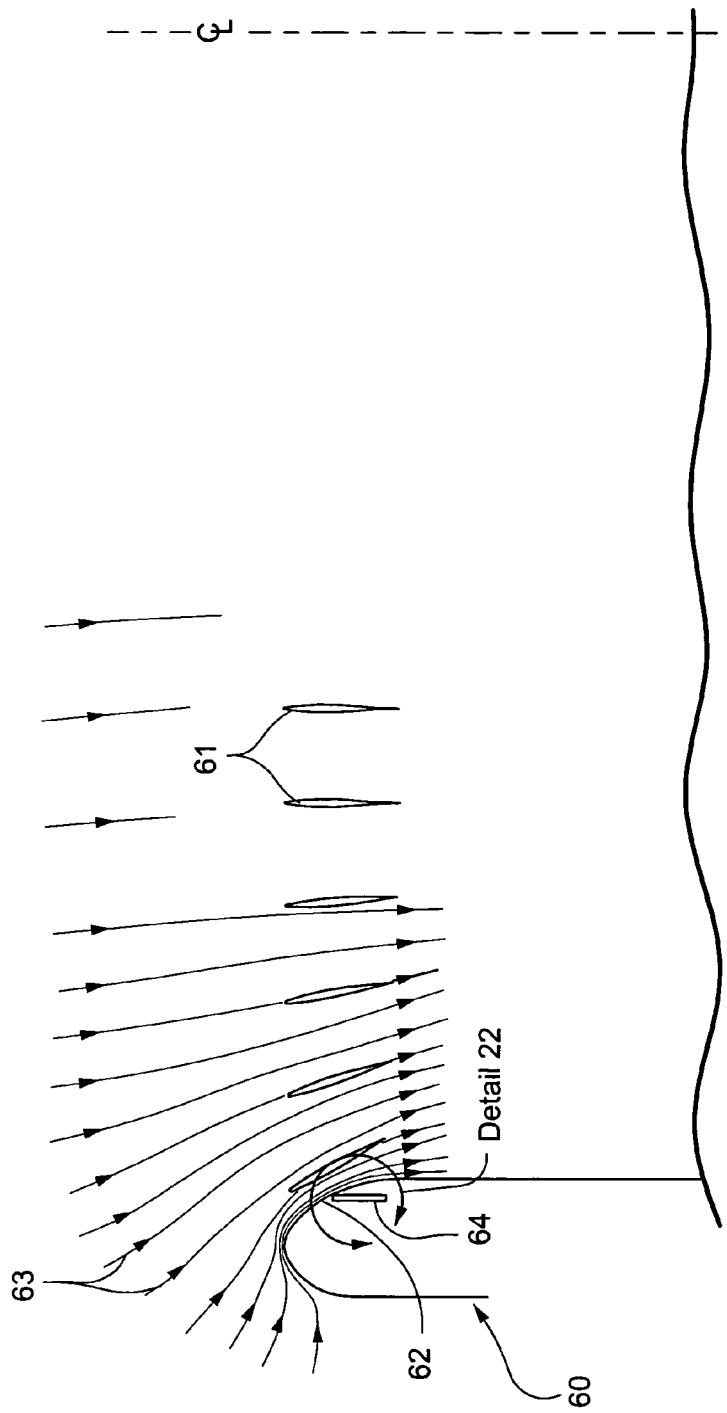
FIG. 21 illustrates schematic fluidic-control-assisted fluid flow in a cross section of non-pivotal vanes twisted along their longitudinal axis to adjust their plane of symmetry to the local variations in the incoming flow into the duct.

FIG. 21 illustrates the schematic cross section of a duct 60 with twisted vanes. Vanes 61 are untwisted near the center of the duct and twisted near the surface of inlet edge 62 of the duct where the affected flow field 63 is schematically shown. A schematic fluidic control means 64 incorporated into the inner surface of the duct is affecting the flow field in the vicinity of the duct wall.

Figure 22:
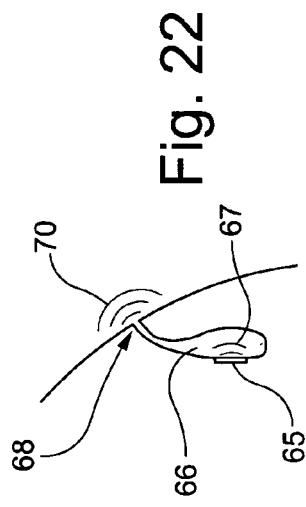
FIG. 22 is a detail taken from FIG. 21 showing a piezo-electric device in the duct wall for creating high frequency pressure pulses inside the duct.

The detail in FIG. 22 further clarifies the method of incorporation of fluidic control means 64. Shown in FIG. 22 is a cross section showing as an example a piezoelectric device shown as 65 that creates high frequency, periodically alternating pressure pulses (or vibratory oscillations) inside an adjacent cavity shown schematically as 66. The pressure pulses shown as 67 created by the device 65 are carried to the slot 68 whereby the pressure pulses shown as 70 emanating from narrow slot 68 interact with the flow shown as 63 in FIG. 21 affecting the behavior of the flow in the vicinity of the edge of the duct shown in FIG. 21 as 62. In the embodiment shown, the pressure pulses exit the slot 68 axially between the leading and trailing edges of the vanes. The detail shown in FIG. 22 (with the exception of the curvature in the duct wall unique to the duct inlet) is equally applicable to supplying pressure pulses to affect flow at a second plurality of vanes across an exit end of the duct (see vanes 52 in FIG. 17 for example).

Thus, the present invention descried hereinabove with reference to FIGS. 1-16 may also employ the non-pivotal vane configuration described with reference to FIGS. 17-21.

It will be appreciated that any of the foregoing arrangements may be used in any of the above-described air vehicles to produce the desired control forces in addition to the life forces. The vanes are not intended to block air flow, but merely to deflect air flow to produce the desired control forces. Accordingly, in most applications the pivotally mounted vanes would be designed to be pivotal no more than 15° in either direction, which is the typical maximum angle attainable before flow separation. The non-pivotal vanes would be designed with their cross section longitudinal axis substantially parallel to the longitudinal axis of the duct and preferably adjusted to variations in local flow angularity, either through mounting of the complete vane at an angle to the longitudinal axis of the duct, or by using a vane that is twisted along its longitudinal axis to match with greater accuracy the local angularity of the incoming flow, or by combining both angular mounting and built-in twist as required for generating in the most effective manner the side forces to produce desired forward, aft, left and right translation movements, as well as yaw, pitch and roll rotary movement of the vehicle.

Since the control forces and moments are generated by horizontal components of the lift forces on the vanes themselves, the vanes should preferably be placed on the intake side of the propeller as far from the center of gravity of the vehicle as possible for creating the largest attainable moments. The same applies if vanes are provided on the exit side of the ducts.

While the invention has been described above particularly with respect to air vehicles, it will be appreciated that the invention, or various aspects of the invention as described above, can also be advantageously used with other types of vehicles such as sea vehicles, to provide propulsion and directional control to the vehicles.

Accordingly, while the invention has been described with respect to several preferred embodiments, it will be understood that these are set forth merely for purposes of example, and that many other variations, modification and applications of the invention may be made.

What is claimed is:

1. A vehicle, comprising:
    a vehicle frame;
    a duct carried by said vehicle frame with the longitudinal axis of the duct perpendicular to the longitudinal axis of the vehicle frame;
    a propeller rotatably mounted within said duct about the longitudinal axis of the duct to force an ambient fluid from an inlet at the upper end of the duct through an exit at the lower end of the duct, and thereby produce an upward lift force applied to the vehicle; and
    a first plurality of, spaced vanes non-pivotally mounted across at least the inlet end of the duct said first plurality of spaced vanes having parallel longitudinal axes; and
    fluidic means provided in a wall of said duct for affecting said ambient fluid flow around said vanes to generate horizontal force components to the lift force applied to the vehicle.

2. The vehicle of claim 1 wherein said vanes have an airfoil-shaped cross section.

3. The vehicle of claim 1 wherein said vanes have an elliptical cross section.

4. The vehicle of claim 1 and comprising a second plurality of parallel spaced vanes non-pivotally mounted across an exit end of said duct.

5. The vehicle of claim 4 wherein at least some of said second plurality of vanes are twisted at outer ends thereof.

6. The vehicle of claim 1 wherein said first plurality of vanes extend substantially parallel to said longitudinal axis of said vehicle frame.

7. The vehicle of claim 4 wherein said second plurality of vanes extend substantially parallel to said longitudinal axis of said vehicle frame.

8. The vehicle of claim 1 wherein at least some of said first plurality of vanes are twisted at outer ends thereof.

9. The vehicle of claim 1 wherein said first plurality of vanes is divided into first and second groups of parallel vanes, each group making an angle of substantially 45° to the longitudinal axis of the vehicle frame, with the first group extending at an angle of substantially 90° to the second group.

10. A ducted propulsion unit for a VTOL vehicle, the propulsion unit comprising:
    a duct having an interior defined by a peripheral wall, inlet end and an exit end;
    a propeller located in said duct interior axially between said inlet end and said exit end;
    at least a first plurality of non-pivotal, substantially parallel spaced vanes extending across the inlet end; and
    at least one fluidic control device provided in said peripheral wall of said duct and located in proximity to said first plurality of vanes for affecting fluid flow about one or more of said first plurality of vanes.

11. The ducted propulsion unit of claim 10 wherein said fluidic control device comprises a piezoelectric actuator located, adjacent a chamber in said peripheral wall, said chamber in fluid communication with said duct interior.

12. The ducted propulsion unit of claim 11 and comprising a second plurality of substantially parallel spaced vanes non-pivotally mounted across an exit end of said duct; and
    further comprising at least another piezoelectric actuator located in proximity to said second plurality of vanes.

13. The ducted propulsion unit of claim 10 wherein said fluid control device is capable of applying a vacuum in proximity to one or more of said first plurality of vanes.

14. The ducted propulsion unit of claim 10 wherein said fluid control device is capable of supplying pressurized air in proximity to one or more of said first plurality of vanes.

15. A method of generating horizontal forces in a ducted propulsion unit of a VTOL vehicle comprising:

(a) arranging at least one duct in a frame of the vehicle, the duct having inlet and exit ends, with a propeller mounted within the duct between the ends;

(b) securing a plurality of non-pivotal vanes across at least the inlet end of the duct; and (c) affecting air flow from a location within a peripheral wall of said duct, about said plurality of non-pivotal vanes to create horizontal control forces on the vehicle.

16. The method of claim 15 wherein step (c) is carried out by applying suction through apertures in said peripheral wall of the duct or in at least some of said plurality of vanes.

17. The method of claim 15 wherein step (c) is carried out by applying air under pressure through apertures in said peripheral wall of the duct.

18. The method of claim 15 wherein step (c) is carried out by utilizing piezoelectric actuators supported in said peripheral wall of said duct to generate periodically alternating pressure pulses at the inlet end of said duct.

19. The method of claim 18 wherein said piezoelectric actuator is located adjacent a cavity in said peripheral wall at the inlet end of said duct, such that pressure pulses generated by said actuator emanate from said cavity into the air flowing into the duct at the inlet end thereof.

20. The method of claim 19 wherein the pressure pulses emanate into the air at a location between leading and trailing edges of the vanes.

21. The method of claim 15 wherein step (b) includes securing a second plurality of non-pivotal vanes across the exit end of the duct.

22. The method of claim 21 wherein step (c) includes affecting air about the second plurality of non-pivotal vanes.

* * * * *